United States Patent
Bouloy et al.

(10) Patent No.: US 7,036,745 B2
(45) Date of Patent: May 2, 2006

(54) THERMOSTATIC VALVE FOR A FLUID CIRCULATION CIRCUIT AND A HEAT ENGINE ASSOCIATED WITH A COOLING CIRCUIT COMPRISING SUCH A VALVE

(75) Inventors: Alain Bouloy, Etrechy (FR); Lionel Mabboux, Sainte Genevieve des Bois (FR); Eddy Jure, Saint Cloud (FR)

(73) Assignee: Vernet S.A., Arpajon Cedex (FR)

( * ) Notice: Subject to any disclaimer, the term of this patent is extended or adjusted under 35 U.S.C. 154(b) by 0 days.

(21) Appl. No.: 10/864,325

(22) Filed: Jun. 10, 2004

(65) Prior Publication Data

US 2005/0001045 A1    Jan. 6, 2005

(30) Foreign Application Priority Data

Jun. 11, 2003   (FR) .................................. 03 07023

(51) Int. Cl.
G05D 23/00 (2006.01)
(52) U.S. Cl. ................................................. 236/101 R
(58) Field of Classification Search .................. 236/34, 236/34.5, 68 R, 101 C, 101 R; 123/41.08, 123/41.44, 41.8
See application file for complete search history.

(56) References Cited

U.S. PATENT DOCUMENTS

| | | | | |
|---|---|---|---|---|
| 3,907,199 A | * | 9/1975 | Kreger | 237/12.3 B |
| 4,319,547 A | * | 3/1982 | Bierling | 123/41.29 |
| 4,399,775 A | * | 8/1983 | Tanaka et al. | 123/41.08 |
| 4,399,776 A | * | 8/1983 | Shikata | 123/41.08 |
| 4,522,334 A | * | 6/1985 | Saur | 236/34.5 |
| 4,875,437 A |   | 10/1989 | Cook et al. | |
| 5,183,012 A | * | 2/1993 | Saur et al. | 123/41.08 |
| 5,427,062 A |   | 6/1995 | Chamot et al. | |
| 5,582,138 A | * | 12/1996 | Ziolek et al. | 123/41.1 |
| 5,676,308 A | * | 10/1997 | Saur | 236/34.5 |
| 6,044,808 A | * | 4/2000 | Hollis | 123/41.1 |
| 6,315,209 B1 | * | 11/2001 | Tripp | 236/12.16 |
| 6,460,492 B1 | * | 10/2002 | Black et al. | 123/41.1 |
| 6,584,941 B1 | * | 7/2003 | Richter | 123/41.1 |
| 6,595,165 B1 | * | 7/2003 | Fishman et al. | 123/41.1 |
| 2002/0096130 A1 |  | 7/2002 | Fishman et al. | |

FOREIGN PATENT DOCUMENTS

| | | | |
|---|---|---|---|
| DE | 0125380 A2 | * | 11/1984 |
| FR | 2434723 | | 3/1980 |
| FR | 2557632 | | 7/1985 |
| FR | 1030040 A1 | * | 8/2000 |

* cited by examiner

Primary Examiner—Mohammad M. Ali
(74) Attorney, Agent, or Firm—Wenderoth, Lind & Ponack, L.L.P.

(57) ABSTRACT

A thermostatic valve comprises a casing which delimits openings for circulation of a fluid, a mobile sleeve for regulating passage of the fluid between the openings, a fixed seat for receiving the sleeve and a thermostatic member which has a mobile piston. The sleeve is mounted on the piston in such a manner to control, at least in part, displacements of the sleeve relative to the seat. The valve also comprises a controlled member for driving a body of the thermostatic member in accordance with a direction of displacement of the piston.

22 Claims, 5 Drawing Sheets

THERMOSTATIC VALVE FOR A FLUID
CIRCULATION CIRCUIT AND A HEAT
ENGINE ASSOCIATED WITH A COOLING
CIRCUIT COMPRISING SUCH A VALVE

TECHNICAL FIELD

The present invention relates to a thermostatic valve for a fluid circulation circuit, comprising a tubular sleeve as a shutter for regulating passage of a fluid through the valve.

BACKGROUND OF THE INVENTION

This type of valve is commonly employed in cooling circuits associated with heat engines having large cubic capacities, especially those with which trucks or some motor vehicles are equipped, in a case of which cooling fluid flow rates necessary for their operation are higher than those encountered in a case of heat engines having smaller cubic capacities, for which thermostatic valves generally have a flap.

FIG. 1 shows a known valve 1 of that type, distributed under reference "DB 54" by the company VERNET (France), which comprises a casing 2 delimiting a fluid inlet 2A and two fluid outlets 2B and 2C. The valve is, for example, incorporated in a cooling circuit in such a manner that the inlet 2A is supplied with a cooling fluid coming from an engine, the outlet 2B is connected to a path for direct return of the fluid to the engine, and the outlet 2C is connected to a return path extending through a heat exchange radiator. In order to regulate passage of the fluid between the inlet and one and/or the other of the outlets, the valve 1 is provided with a tubular sleeve 3, of which base 3A is open, a skirt 3B is solid and a free rim 3C is flared in a shape of a flat annular disc. The skirt 3 is guided by a seal J in an opening which separates passages 2B and 2C.

The rim 3C is suitable for coming into sealing contact with a seat 4 which is fixedly joined to the casing in such a manner that, when the sleeve is supported against the seat, fluid entering the valve by way of the inlet 2A is directed, inside the sleeve, as far as the outlet 2B and, when the sleeve is moved away from its seat, at least some of this incoming fluid is diverted around the sleeve in order to be evacuated from the valve by way of the outlet 2C.

Displacements of the sleeve 3 relative to the seat 4 are controlled by a thermostatic member 5 whose body 5A is located in a flow path of the fluid, at a location of the inlet 2A, and whose piston 5B abuts an end piece 9A which is itself fixedly joined to the base 3A of the sleeve. When a temperature of fluid in which the body 5A is immersed increases, expandable wax contained by that body brings about displacement of the piston 5B and a driving of the sleeve. A spring 6 is interposed between a stirrup 9B which is fixedly joined to the end piece 9A, and therefore to the sleeve 3, and a support member 7 which is fixedly joined to the body of the thermostatic member in order to return the sleeve to its seat when the temperature of the fluid decreases.

It will be appreciated that, when a temperature of incoming fluid is very high, displacement of the sleeve 3 is such that it abuts a wall 2D of the casing 2, which wall is located in a path of the sleeve. In order to prevent damage to the wall and/or the thermostatic member 5, it is provided that the body 5A of the thermostatic member is not connected rigidly to bridges 4A of the seat 4 but is positioned by these bridges while preserving freedom of displacement in a direction of displacement of the piston. Thus, when the sleeve comes into abutment with the wall 2D, the piston is immobilized relative to the casing, and the body 5A moves away from the piston (towards the right in FIG. 1). In order to return the body 5A and keep constituents of the valve at rest, an over-travel spring 8 is provided between the support member 7 and the bridges 4A of the seat 4.

Although the valve described above is satisfactory, it nevertheless has a disadvantage of being impossible to regulate once assembled and incorporated in a cooling circuit because a temperature at which the sleeve starts to move away from its seat, and a degree of opening of a passage between the inlet 2A and the outlet 2C, are predetermined by the thermostatic member used. That disadvantage is even more marked when it is desired to design a cooling circuit for a vehicle which is to travel under varied operating conditions, in particular in accordance with a speed of the vehicle and/or a load drawn by that vehicle.

SUMMARY OF THE INVENTION

An object of the present invention is to propose a valve of the type described above which, while regulating substantial fluid flow rates, has a great versatility of use, especially with a view to adjusting regulation capacities of the valve in accordance with operating conditions of a cooling circuit in which it is incorporated.

To that end, the invention relates to a valve for a fluid circulation circuit, in particular a cooling circuit associated with a heat engine, of the type comprising:
  a casing which delimits a chamber in which openings for circulation of a circulation circuit fluid open out;
  a sleeve for regulating passage of the fluid between the openings, which sleeve is mobile relative to the casing;
  a seat for supporting the sleeve, which seat is fixed in position relative to the casing; and
  a thermostatic member which comprises, on the one hand, a body arranged in accordance with a flow path of the fluid in the valve, at a location of one of the fluid circulation openings, and containing an expandable material, and, on the other hand, a piston which is mobile relative to the body and on which the sleeve is mounted in such a manner that relative displacements between the sleeve and the seat are, at least partially, controlled by relative displacements between the piston and the body of the thermostatic member, characterized in that the thermostatic member also comprises a controlled member for driving the body of the thermostatic member in accordance with a direction of displacement of the piston.

The member (drive member) for driving the body of the thermostatic member according to the invention enables the body of the thermostatic member to be displaced in a selected manner relative to the fixed seat in order, as it were, to increase a stroke of the piston necessary to cause the sleeve to move away from its seat. In that manner, a temperature of incoming fluid at which the sleeve is moved away from its seat, and degrees of spacing of the sleeve, can be regulated in operation without, for all that, modifying an overall geometry of the casing of the valve or modifying a composition of the expandable material.

According to other features of the valve, taken in isolation or in accordance with any technically possible combination:
  the drive member is located at least in part inside the sleeve;
  the drive member comprises a rigid stirrup provided with a first end portion fixedly joined to the body of the thermostatic member and with a second, opposite, end portion which is located, relative to that body, on the same side as the piston of the thermostatic member and which is suitable for being connected to a drive device for translational drive in accordance with a direction of displacement of the piston;

the valve comprises a member for returning the body of the thermostatic member, which member is interposed between the drive member and the seat;

the second end portion of the rigid stirrup carries a support surface for an actuator of the drive device, and the member for returning the body of the thermostatic member is interposed between the first end portion of the stirrup and the seat in such a manner as to place the support surface against the actuator;

the piston of the thermostatic member controls displacement of the sleeve in such a manner that the sleeve moves away from the seat, and associated structure for returning the sleeve to its seat is interposed between the second end portion of the rigid stirrup and the sleeve;

the sleeve is mounted on the piston of the thermostatic member by virute of an end piece adapted to provide lost motion;

the drive device is selected from a thermostatic member controlled by heating structure and a reversible electrical motor;

the casing delimits a cavity opening out on a wall of the casing, which wall forms a stop surface for the sleeve, with the cavity being suitable for receiving, at least in part, the drive device;

the second end portion of the rigid stirrup is accommodated in the cavity; and the wall of the casing delimiting the cavity has a through-opening suitable for receiving in a removable manner a fixed portion of the drive device, or a plug.

The invention relates also to a heat engine associated with a circuit for circulation of a fluid for cooling the engine, which circuit comprises structure for driving the fluid, heat exchange structure suitable for cooling the fluid, and a valve as defined above, as well as connection structure between the valve and the heat engine, which connection structure is suitable for sending, as a function of a position of a regulation sleeve, at least a portion of the cooling fluid to the engine after it has passed through the heat exchange structure.

BRIEF DESCRIPTION OF DRAWINGS

The invention will be understood well on reading the following description which is given purely by way of example with reference to the drawings in which.

DETAILED DESCRIPTION OF THE PREFERRED EMBODIMENTS

Figure 2:
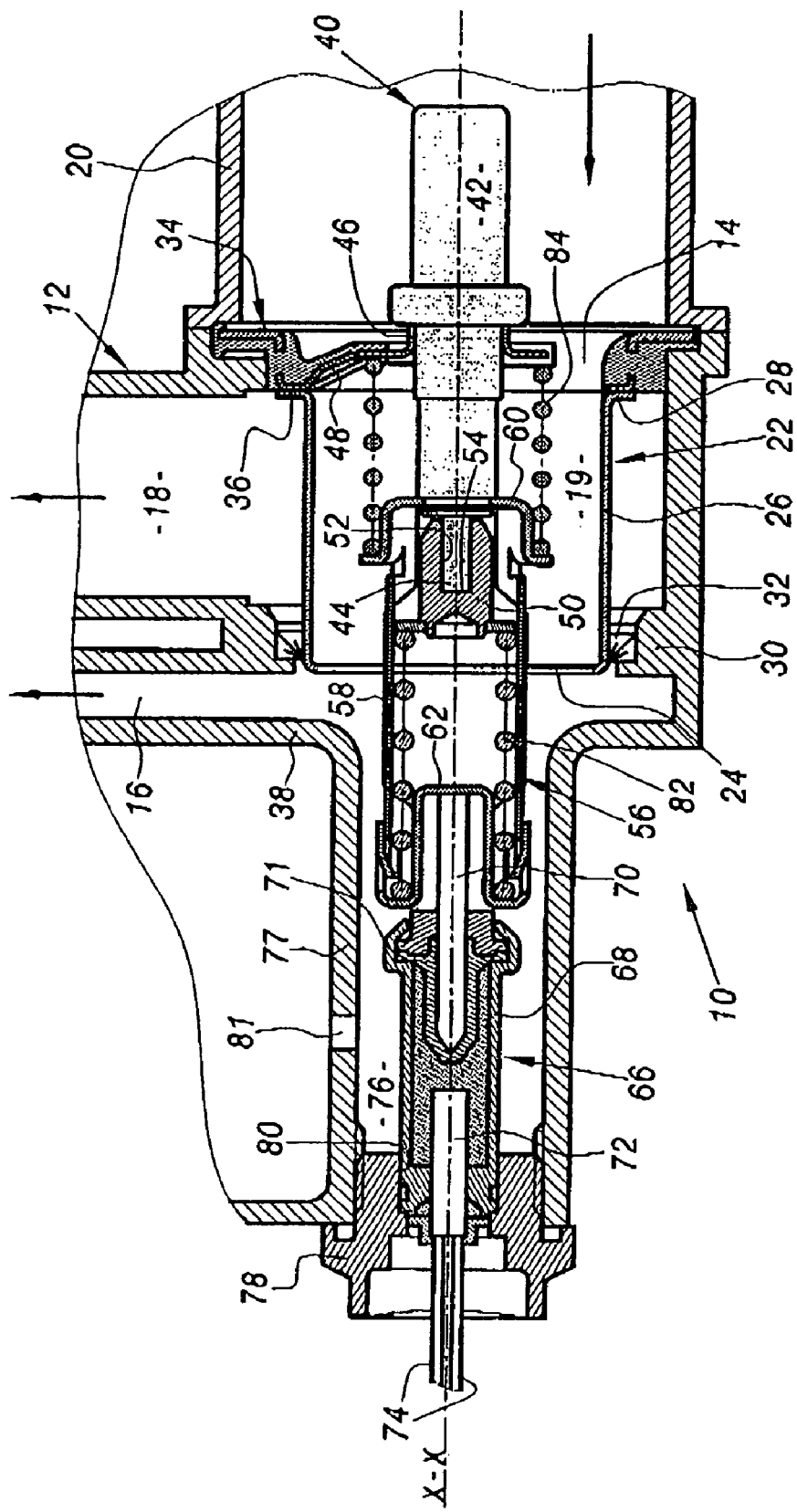
FIG. 2 is a longitudinal sectional view through a thermostatic valve according to the invention which is provided with a control member having expandable material and which is controlled electrically.
Figure 5:
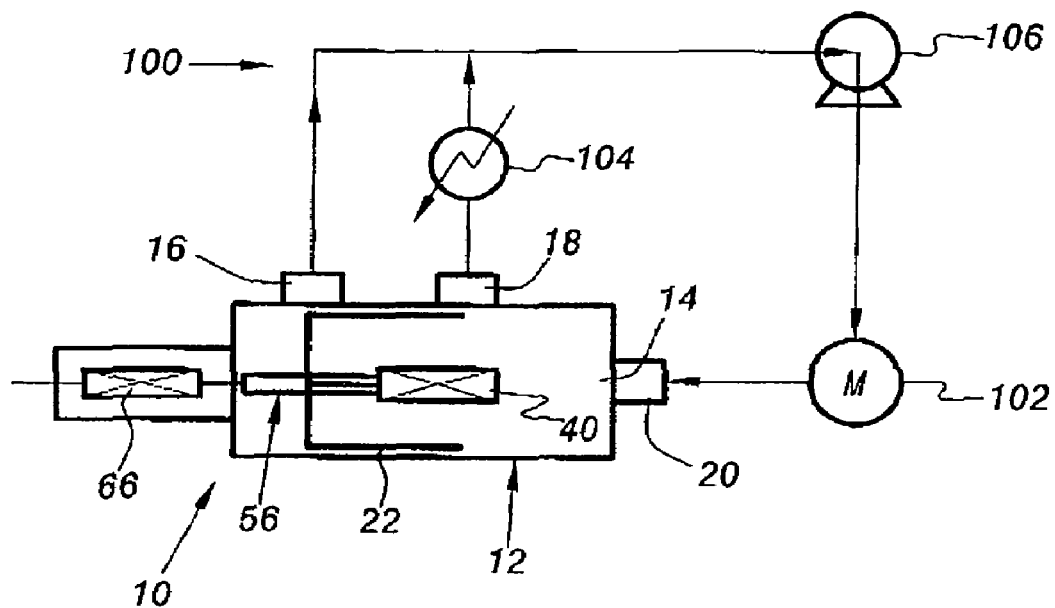
FIGS. 5 and 6 are block diagrams of cooling circuits associated with a heat engine according to the invention.

FIG. 2 shows a valve 10 comprising a casing 12 which delimits openings or accesses for fluid 14, 16 and 18, which all open out in a regulation chamber 19. The valve 10 is suitable for regulating passage of a fluid entering the casing 12 by way of the access 14 and leaving the casing again by way of one and/or another of the accesses 16 and 18. As shown in FIG. 5, the valve 10 is, for example, used in a cooling circuit 100 of a truck engine 102. To that end the valve 10 comprises a tubular inlet duct 20 which is attached to the casing 12 at a location of inlet access 14 and which is suitable for supplying the valve 10 with a cooling liquid coming from the engine. The valve, under specific conditions detailed hereinafter, regulates incoming fluid by sending most or only a portion of that fluid to the outlet access 16 connected to a direct return path to the engine (also called a by-pass path), which path is provided with a drive pump 106, and/or to the outlet access 18 connected to a path which, before reaching the engine, passes through a heat exchanger 104 which cools the fluid, such as a radiator.

In order to regulate the passage of the fluid to the outlet accesses 16 and 18, the valve 10 is equipped with a tubular sleeve 22 which has an axis X—X and which comprises an open base 24 and a solid cylindrical skirt 26 which, at its free end, forms an external annular rim 28. The sleeve 22 is mounted slidingly in accordance with its axis X—X inside the casing 12. The sleeve 22 is guided by a cylindrical wall portion 30 of the casing, which wall portion surrounds the sleeve in the vicinity of its open base 24, with interposition of a seal 32. The fluid outlet accesses 16 and 18 extend on each side of the wall portion 30, in accordance with the axis X—X.

A seat 34 extending across the inlet access 14 is gripped between the casing 12 and attached duct 20. On a side facing an inside of the casing 12, the seat 34 has an annular surface 36 forming a sealed support region for flared rim 28 of the sleeve 22.

The sleeve 22 is displaceable between a position supported on the seat 34, as shown in FIG. 2, in which position the fluid entering the casing 12 through the access 14 is sent, through the open base 24, as far as the outlet access 16, and a position moved away from the seat, in which position incoming fluid flows, at least in part, around the sleeve 22 in order to supply the outlet access 18. The sleeve is thus displaceable as far as an extreme remote position in which the base 24 of the sleeve is supported against a wall 38 of the casing, which wall is located opposite the seat 34. In that extreme position, the solid skirt 26 of the sleeve, the seal 32 and the wall 38, which forms, as it were, a second seat for the sleeve, prevent at least a majority of fluid circulating in the valve from supplying the outlet access 16, to a benefit of the outlet access 18.

With a view, under specific conditions detailed below, to displacing the sleeve 22 in translation along the axis X—X, the valve 10 is equipped with a thermostatic member 40 basically comprising a body 42 and a piston 44 in the form of a rod which is mobile relative to the body. To be more precise, the body 42 is suitable for containing an expandable wax. It extends substantially coaxially with the axis X—X and is positioned in the valve 10 by a collar 46 formed by free ends of radial arms 48 of the seat 34.

An end portion of the piston 44 dips into the body 42 where it is supported on the expandable wax contained in the body 42, with interposition of a resilient diaphragm. Its opposite end portion is connected to the base 24 of the sleeve 22 by an end piece 50 which is fixedly joined to the base 24. To be more precise, the piston 44 is received in a blind cavity 52 of the connecting end piece 50, of which cavity lateral walls are in sliding contact with the piston, and the base 54 forms a support region for the piston in accordance with the axis X—X.

The valve 10 also comprises an elongate rigid stirrup 56 which is fixedly joined to the body 42 and which extends in accordance with the axis X—X. The stirrup comprises at least two diametrically opposed branches 58 which are parallel with the axis X—X. In a variant which is not shown, a single branch may be provided or the two branches are replaced by a tubular member. The branches 58 extend through the open base 24 of the sleeve 22. Their end portions accommodated inside the sleeve 22 are joined, forming an annular collar 60 which is fixedly joined to the body 42 of the thermostatic member. The collar is, for example, held inside an annular peripheral groove formed in an external wall of the body 42.

The end portions of the branches 58 that are located outside the sleeve 22 are connected by a rigid dish 62 coaxial with the axis X—X. The branches 58, the collar 60 and the dish 62 of the stirrup 56 form an assembly which is all in one piece, with these various members being, for example, fixedly joined to one another by crimping.

The stirrup 58 is suitable for co-operating with another thermostatic member 66 which is coaxial with the axis X—X and which comprises a body 68 and a piston 70. The body 68 contains an expandable wax in which one end of the piston 70 is immersed, with interposition of a resilient diaphragm 71. A free end of the piston is received inside the dish 62, with an end edge of the piston being supported directly on the dish.

At an end opposite the piston 70, the body 68 of the thermostatic member 66 is traversed by a device for heating the expandable wax, which is in the form of an electrical heating resistor 72 whose terminals 74 are suitable for being connected to a source of electrical power (not shown).

The thermostatic member 66 and a portion of the stirrup 56 located outside the sleeve 22 are accommodated inside a cavity 76 which extends in accordance with the axis X—X and is delimited by a tubular extension 77 of the casing 12, which extension is connected to the wall 38, with the cavity 76 opening out in the regulation chamber 19. At its end opposite the end opening out in the chamber, the cavity 76 is closed in a sealed manner by a cap 78, which is, for example, screwed onto an internal face of the extension 77. Internally, the cap has a central bore 80 which, on a side facing the regulation chamber, receives the body 68 of the thermostatic member 66 in a sealed manner and which, on an opposite side, is suitable for permitting passage of electrical connection terminals 74 of the heating resistor 72.

A wall of the extension 77 is advantageously provided with a through-hole 81 which is to prevent any region of fluid stagnation in the cavity 76 around the member 66.

The valve 10 also comprises a first helical spring 82 which is coaxial with the axis X—X and which is interposed between the dish 62 and the base 24 of the sleeve 22, as well as a second helical spring 84 which is coaxial with the axis X—X and which is interposed between the collar 60 and the arms 48 of the seat 34.

Operation of the thermostatic valve 10 is as follows:

Considering first of all a situation where the thermostatic member 66 is inactive, a rise in temperature of fluid in which the body 42 of the thermostatic member 40 is immersed causes expansion of the wax contained by that body, thereby expelling the piston 44 from the body. The piston 44 then drives the sleeve 22 in a translational movement in accordance with the axis X—X, with this drive effort being transmitted to the base 24 of the sleeve by the end piece 50. The sleeve then passes from its position, represented in FIG. 2, supported on the seat 34 to a position moved away from that seat, thereby bringing about distribution of incoming fluid between the outlets 16 and 18. In a situation where the stirrup 56 is fixed in position relative to the casing 12, displacement of the sleeve also brings about compression of the spring 82.

If a temperature of incoming fluid continues to increase, the piston 44 displaces the sleeve 22 until it bears against the wall 38 of the casing 12, thus forcing almost all of the incoming fluid to leave the casing 12 by way of the outlet 18. If the temperature of the incoming fluid still continues to increase to an extent that the piston 44 can no longer be displaced relative to the casing 12, the body 42 is displaced, relative to the piston, in a direction opposite that previously followed by the piston 44 relative to the body 42; that is to say, towards the right in FIG. 2. The body 42 is then guided in translation by the collar 46, and the spring 84 is compressed between the arms of the fixed seat and the collar 60 fixedly joined to the body 42.

When the temperature of the fluid decreases, the body 42 is first of all returned relative to the casing into its position in FIG. 2 by the spring 84, which acts as an over-travel spring for the body 42. Then, if the temperature of the incoming fluid continues to decrease, the sleeve 22 is returned to the seat 34 by the spring 82.

Independently of the operation described above, which is based on an influence of a variation in a temperature of a fluid entering the casing 12 on the thermostatic member 40, a position according to the axis X—X of the body 42 of the thermostatic member 40 can be regulated by virtue of the rigid stirrup 56 and the thermostatic member 66. By controlling electrical power supply to the heating resistor 72, the piston 70 is expelled from the body 68 under an effect of expanded wax and then drives the stirrup 56 in translation in accordance with the axis X—X, in a direction opposite the direction of displacement of the piston 44 when the temperature of the incoming fluid increases. Since the stirrup 56 is connected rigidly to the body 42 of the thermostatic member 40, displacement of the stirrup brings about a corresponding displacement of the body 42 guided in translation by the collar 46.

Movement of the stirrup 56 is transmitted, on the one hand, in a rigid manner to the body of the thermostatic member 40 and, on the other hand, in a resilient manner by virtue of the spring 82 to the sleeve 22. By virtue of the end piece 50, a position of the sleeve 22 is determined by an abutment on an edge of the piston 44, except when its flared end 28 is already in abutment on the seat 34, which then causes the piston 44 to slide along a wall of the cavity 52 of the end piece 50.

Figure 1:
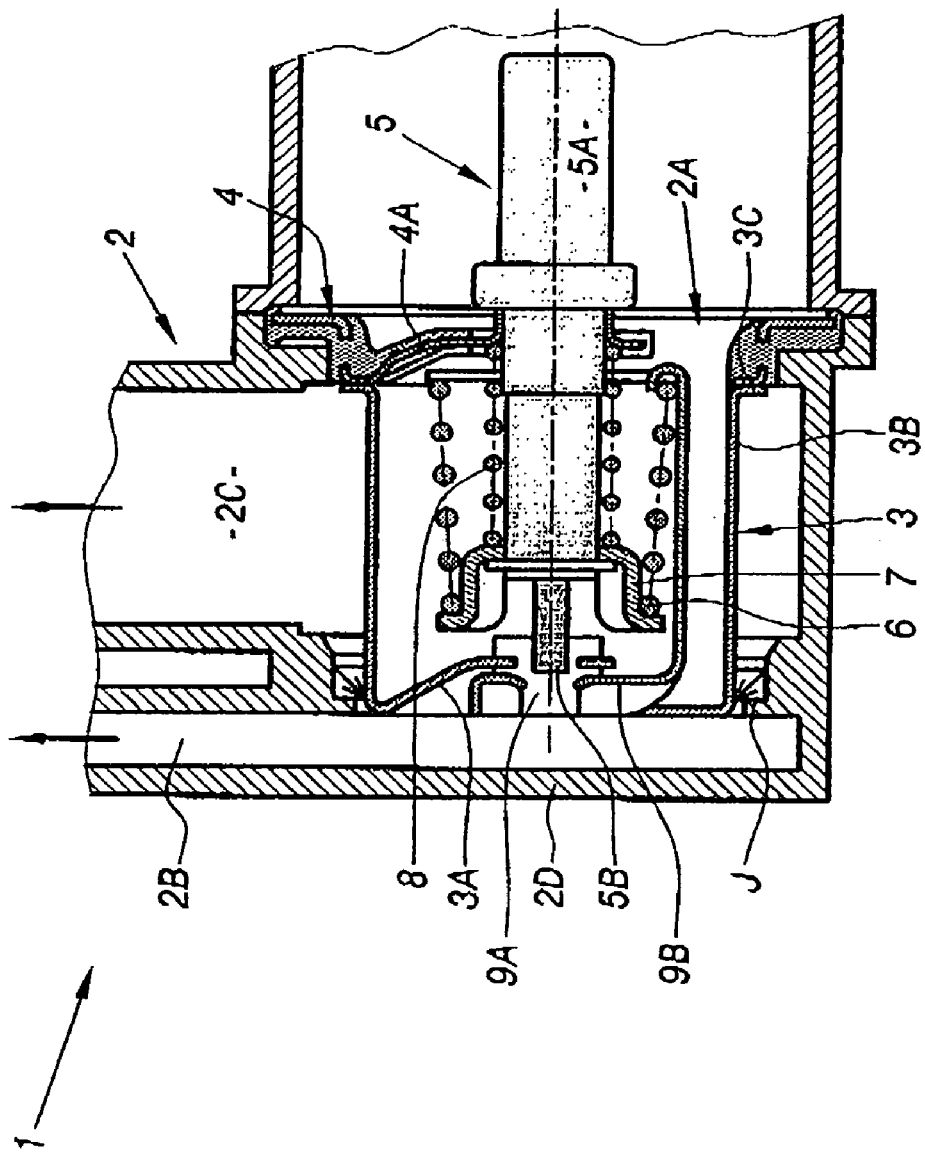
FIG. 1 is a longitudinal sectional view through a thermostatic valve according to prior art.

It will be appreciated that the valve 10 offers greater versatility of use than valves of the prior art, especially that of FIG. 1. In particular, owing to the stirrup 56, it is possible to displace the body 42 of the thermostatic member 40 relative to the casing 12 in order to change a temperature of incoming fluid at which the sleeve 22 is moved away from its seat 34, as well as a magnitude of that away movement. For example, starting from a state of the valve 10 in FIG. 2, displacement of the stirrup 56 in accordance with a translational movement according to the axis X—X in order to move the body 42 of the thermostatic member 40 away from the wall 38, provides clearance between the free end of the piston 44 and the base 54 of the cavity 52 of the end piece 50. In those conditions, when temperature of fluid in which the body 42 is immersed increases, the piston 44 will, in a first stage, be deployed outside the body 42, filling the above-mentioned clearance, before, only in a second stage, bringing about movement of the sleeve 22 away from its seat 34.

The sleeve 22 is controlled in the following manner: when the engine 102 is under relatively little stress, the stirrup 56 is controlled in such a manner that a temperature of incoming fluid at which the sleeve is moved away from its seat is substantial, while, when the engine is greatly stressed, owing in particular to a load drawn by the vehicle, a temperature of incoming fluid at which the sleeve controls sending of fluid to the heat exchanger 104 is reduced. A corresponding control of the stirrup is ensured by suitable electronic control means.

Figure 3:
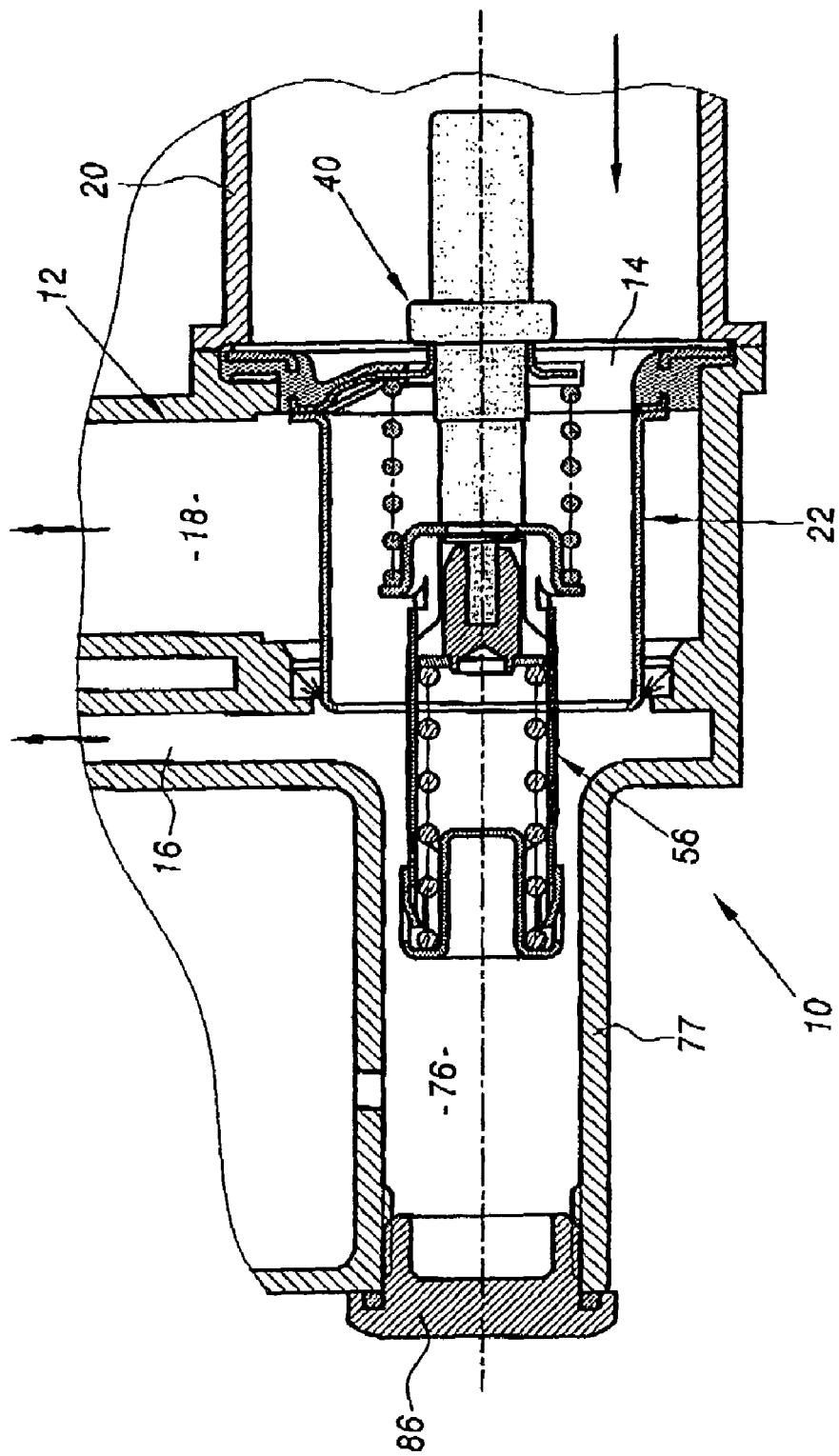
FIG. 3 is a view, analogous to FIG. 2, with the control member being retracted.

FIG. 3 shows the valve 10 without the thermostatic member 66. The closing cap 78 is replaced by a plug 86 placed in a sealing manner on the portion 77 of the casing 12. The plug 86 enables the valve 10 to be used without controlling displacement of the stirrup 56. In other words, in absence of the thermostatic member 66, the valve 10 operates substantially like the valve 1 of the prior art, shown in FIG. 1.

The valve 10 according to the invention thus passes easily from a use without control of displacement of the stirrup 56, either in a case of absence of the control member 66 or in a case where its electrical power supply is cut off, to a use enabling the sleeve 22 to be controlled, as explained above.

Figure 4:
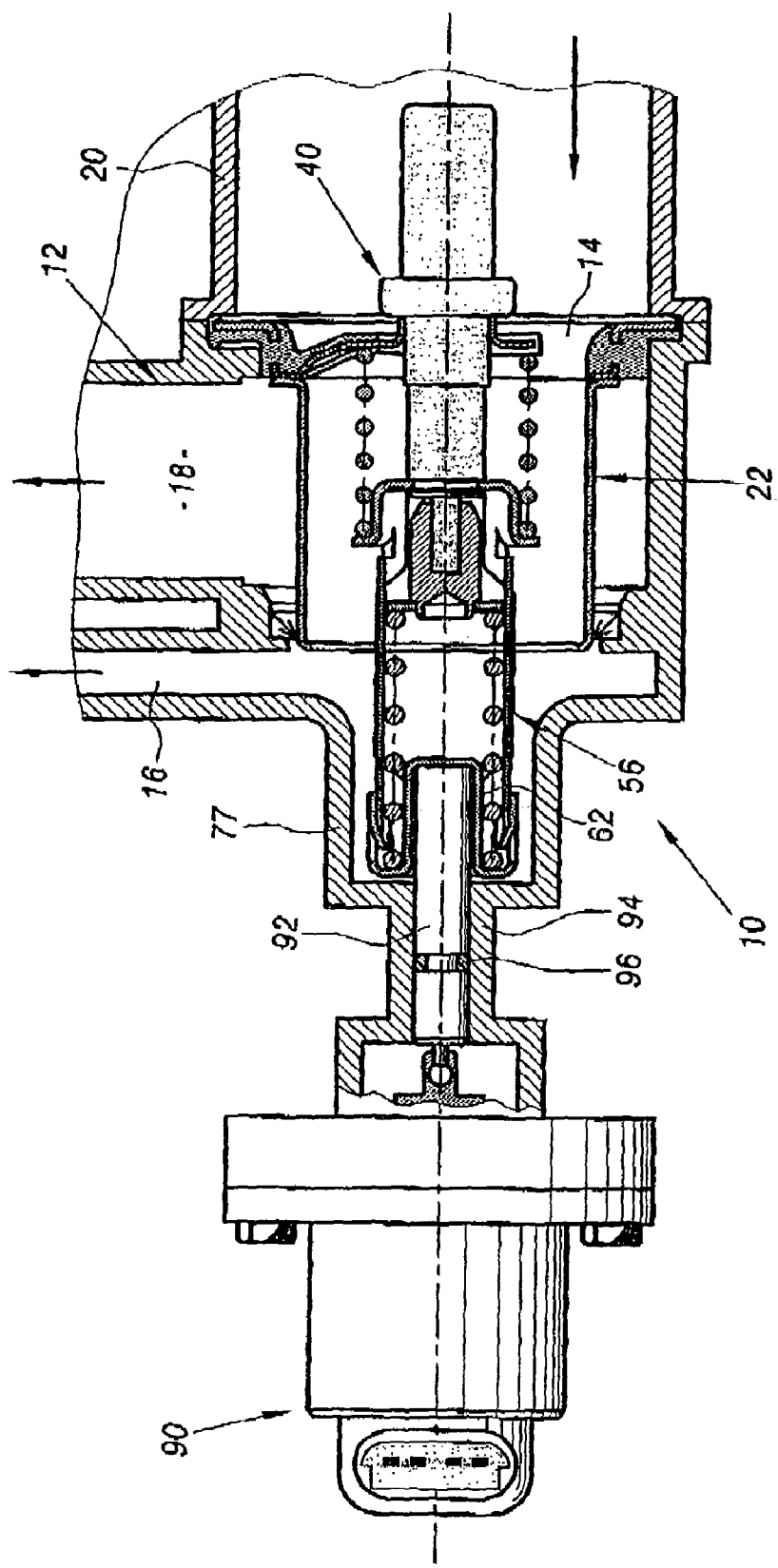
FIG. 4 is a view, analogous to FIG. 2, of a variant of a valve according to the invention provided with an electrical control motor.

FIG. 4 shows a variant of the valve 10 which differs therefrom basically by the shape of the portion 77 of the casing 12, as well as by a nature of the means for controlling displacement of the stirrup 56. To be more precise, relative to the valve of FIG. 2, the thermostatic member 66 is replaced by a reversible electrical stepper motor 90 equipped with an output rod 92 which bears on the dish 62 of the stirrup 56. The rod 92 extends coaxially with the axis X—X and is guided in translation by a part 94 of the portion 77, of smaller diameter. Advantageously, the part 94 has an internal cross-section complementing a cross-section of the rod 92, with interposition of a seal 96 between these two members.

Operation of this variant of the valve 10 is substantially similar to that described above.

In the same manner as for the thermostatic member 66 and the cap 78, the motor 90 is mounted removably on the casing 12 so that it can be withdrawn and replaced by a closing plug similar to the plug 86 represented in FIG. 3, thus enabling the variant of the valve of FIG. 4 to pass from a use with control of the sleeve 22 to a use without control of displacement of the stirrup 56.

Various modifications to the valves according to the invention described above may also be considered. By way of example, a relative arrangement of the accesses 14, 16 and 18 is not limited to that shown, and on the contrary, may satisfy various requirements for integration within a cooling or heating circuit for fluid, especially in substantially mutually perpendicular respective planes. Likewise, the wall 20 and those delimiting the openings 16 and 18 may, as a function of configurations of a circuit in which the valve is integrated, for example, inside a heat engine, be integral parts of components of a cooling circuit, such as a body of a water pump or a distribution box.

Figure 6:
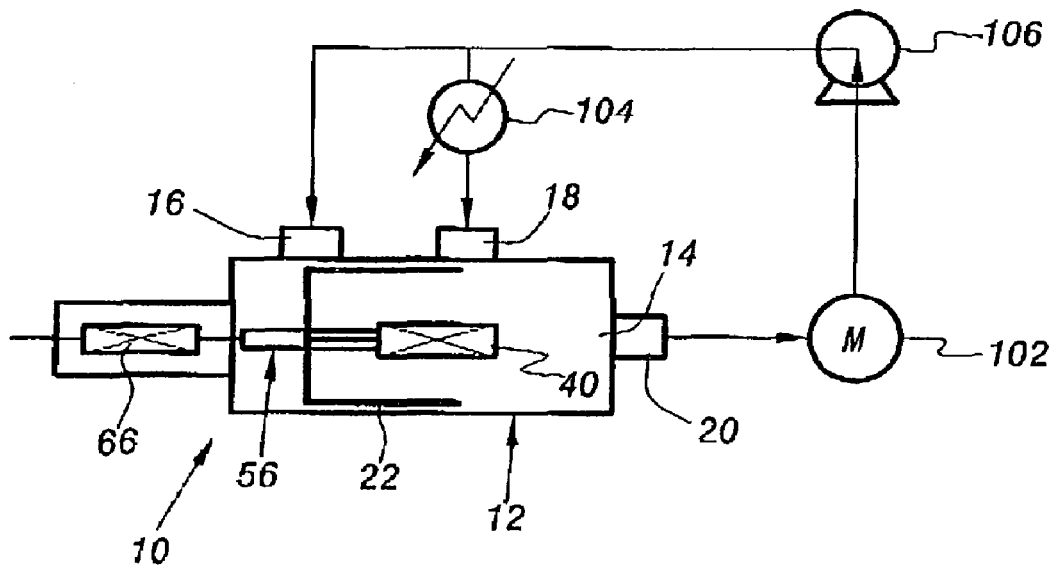

In addition, the valve according to the invention can be used in cooling circuits having, as described hitherto, an inlet 14 for fluid and outlets 16 and 18, but also having reversed directions of flow; that is to say, two inlets 16 and 18 and a single outlet at 14. In that case, as shown, for example, diagrammatically in FIG. 6, opening 16 is connected to a by-pass path in which fluid originates directly from evacuation of engine 102, opening 18 is connected to an outlet of heat exchanger 104 supplied by the evacuation of the engine, and opening 14 evacuates the fluid to the engine. The thermostatic member of the valve, the body of which is arranged at a location of the first inlet access, then controls displacements of the sleeve in such a manner that it shuts off or does not shut off a second inlet access in accordance with a temperature of the fluid in the by-pass path.

The invention claimed is:

1. A thermostatic valve for a fluid circulation circuit, in particular a cooling circuit associated with a heat engine, said thermostatic valve comprising:
   a casing which delimits a chamber having openings for circulation of a circulation circuit fluid;
   a sleeve, movable relative to said casing, for regulating passage of the fluid between said openings;
   a seat, fixed in position relative to said casing, for supporting said sleeve; and
   a thermostatic member including
      (i) a body arranged, at a location of one of said openings, in a flow path of the fluid through said chamber, said body containing an expandable material, and
      (ii) a piston, movable relative to said body, on which is mounted said sleeve in such a manner that relative displacement between said sleeve and said seat is, at least partially, controlled by relative displacement between said piston and said body; and
   a driving member for driving said body of said thermostatic member such that said body and said piston of said thermostatic member become displaced in the same direction.

2. The thermostatic valve according to claim 1, wherein said driving member comprises a rigid stirrup having
   (i) a first end portion fixedly joined to said body of said thermostatic member, and
   (ii) a second, opposite, end portion suitable for being connected to a device for providing a driving force to said rigid stirrup so as to drive said body such that said body and said piston of said thermostatic member become displaced in the same direction.

3. The thermostatic valve according to claim 2, wherein said piston of said thermostatic member is for controlling displacement of said sleeve in such a manner that said sleeve moves away from said seat,
   said thermostatic valve further comprising:
   a member, interposed between said sleeve and said second end portion of said rigid stirrup, for returning said sleeve to said seat after having been displaced by said piston of said thermostatic member.

4. A heat engine associated with a circuit for circulation of a fluid for cooling the heat engine, the circuit comprising
   (i) a device for driving the fluid,
   (ii) a heat exchange device suitable for cooling the fluid,
   (iii) the thermostatic valve according to claim 3, and
   (iv) a connection device, between the thermostatic valve and the heat engine, for sending, as a function of a position of the sleeve, at least a portion of the cooling fluid to the engine after this portion has passed through the heat exchange device.

5. A heat engine associated with a circuit for circulation of a fluid for cooling the heat engine, the circuit comprising
   (i) a device for driving the fluid,
   (ii) a heat exchange device suitable for cooling the fluid,
   (iii) the thermostatic valve according to claim 2, and
   (iv) a connection device, between the thermostatic valve and the heat engine, for sending, as a function of a position of the sleeve, at least a portion of the cooling fluid to the engine after this portion has passed through the heat exchange device.

6. The thermostatic valve according to claim 1, wherein said driving member is located, at least in part, inside said sleeve.

7. A heat engine associated with a circuit for circulation of a fluid for cooling the heat engine, the circuit comprising
(i) a device for driving the fluid,
(ii) a heat exchange device suitable for cooling the fluid,
(iii) the thermostatic valve according to claim 6, and
(iv) a connection device, between the thermostatic valve and the heat engine, for sending, as a function of a position of the sleeve, at least a portion of the cooling fluid to the engine after this portion has passed through the heat exchange device.

8. The thermostatic valve according to claim 1, further comprising:
a member, interposed between said driving member and said seat, for returning said body of said thermostatic member to a position from which said body has been driven by said driving member.

9. A heat engine associated with a circuit for circulation of a fluid for cooling the heat engine, the circuit comprising
(i) a device for driving the fluid,
(ii) a heat exchange device suitable for cooling the fluid,
(iii) the thermostatic valve according to claim 8, and
(iv) a connection device, between the thermostatic valve and the heat engine, for sending, as a function of a position of the sleeve, at least a portion of the cooling fluid to the engine after this portion has passed through the heat exchange device.

10. The thermostatic valve according to claim 1, wherein said driving member comprises a rigid stirrup having
(i) a first end portion fixedly joined to said body of said thermostatic member, and
(ii) a second, opposite, end portion having a support surface for an actuator that is to provide a driving force to said rigid stirrup so as to drive said body such that said body and said piston of said thermostatic member become displaced in the same direction,
said thermostatic valve further comprising:
a member, interposed between said first end portion of said rigid stirrup and said seat, for returning said body of said thermostatic member to a position from which said body has been driven by said rigid stirrup, and for placing said support surface against the actuator.

11. A heat engine associated with a circuit for circulation of a fluid for cooling the heat engine, the circuit comprising
(i) a device for driving the fluid,
(ii) a heat exchange device suitable for cooling the fluid,
(iii) the thermostatic valve according to claim 10, and
(iv) a connection device, between the thermostatic valve and the heat engine, for sending, as a function of a position of the sleeve, at least a portion of the cooling fluid to the engine after this portion has passed through the heat exchange device.

12. The thermostatic valve according to claim 1, wherein said sleeve is mounted on said piston by an end piece adapted to provide lost motion.

13. A heat engine associated with a circuit for circulation of a fluid for cooling the heat engine, the circuit comprising
(i) a device for driving the fluid,
(ii) a heat exchange device suitable for cooling the fluid,
(iii) the thermostatic valve according to claim 12, and
(iv) a connection device, between the thermostatic valve and the heat engine, for sending, as a function of a position of the sleeve, at least a portion of the cooling fluid to the engine after this portion has passed through the heat exchange device.

14. The thermostatic valve according to claim 1, wherein said driving member is for driving said body of said thermostatic member by being driven by one of
(i) a thermostatic member controlled by a heating member, and
(ii) a reversible electrical motor.

15. A heat engine associated with a circuit for circulation of a fluid for cooling the heat engine, the circuit comprising
(i) a device for driving the fluid,
(ii) a heat exchange device suitable for cooling the fluid,
(iii) the thermostatic valve according to claim 14, and
(iv) a connection device, between the thermostatic valve and the heat engine, for sending, as a function of a position of the sleeve, at least a portion of the cooling fluid to the engine after this portion has passed through the heat exchange device.

16. The thermostatic valve according to claim 1, wherein said casing also delimits a cavity extending from a wall of said casing, said wall forming a stop surface for said sleeve when displaced relative to said seat, and said cavity receiving, at least in part, said driving member.

17. The thermostatic valve according to claim 16, wherein said casing also delimits a through hole in communication with said cavity, said through hole being suitable for receiving, in a removable manner, a plug or a fixed portion of said driving member.

18. The thermostatic valve according to claim 1, wherein said driving member comprises a rigid stirrup having
(i) a first end portion fixedly joined to said body of said thermostatic member, and
(ii) a second, opposite, end portion having a support surface for an actuator that is to provide a driving force to said rigid stirrup so as to drive said body such that said body and said piston of said thermostatic member become displaced in the same direction, and
said casing also delimits a cavity extending from a wall of said casing, said wall forming a stop surface for said sleeve when displaced relative to said seat, and said cavity having accommodated therein said second end portion of said rigid stirrup.

19. The thermostatic valve according to claim 18, wherein said casing also delimits through hole in communication with said cavity, said through hole being suitable for receiving, in a removable manner, a plug or a fixed portion of a driving device that is to drive said rigid stirrup member.

20. A heat engine associated with a circuit for circulation of a fluid for cooling the heat engine, the circuit comprising
(i) a device for driving the fluid,
(ii) a heat exchange device suitable for cooling the fluid,
(iii) the thermostatic valve according to claim 1, and
(iv) a connection device, between the thermostatic valve and the heat engine, for sending, as a function of a position of the sleeve, at least a portion of the cooling fluid to the engine after this portion has passed through the heat exchange device.

21. The thermostatic valve according to claim 1, wherein said driving member is for driving said body of said thermostatic member by applying a force in a direction towards said seat.

22. The thermostatic valve according to claim 1, wherein said piston is movable relative to said body such that the relative displacement between said piston and said body comprises movement of said piston while said body remains stationary.

* * * * *